United States Patent [19]
Younkin et al.

[11] 3,783,277
[45] Jan. 1, 1974

[54] LIGHT RESPONSIVE SENSOR SYSTEM

[75] Inventors: James R. Younkin, Fayetteville;
John M. Nixon, Springdale, both of Ark.

[73] Assignee: Edo-Aire Mitchell Industries, Inc., Mineral Wells, Tex.

[22] Filed: June 2, 1972

[21] Appl. No.: 259,044

[52] U.S. Cl............. 250/237 R, 250/204, 250/205, 250/209, 307/311
[51] Int. Cl............................................ H01j 39/12
[58] Field of Search................... 250/204, 205, 209, 250/210, 214, 231, 237, 199; 307/311; 323/21

[56] References Cited
UNITED STATES PATENTS

| | | | |
|---|---|---|---|
| 3,381,212 | 4/1968 | Peltola | 307/311 |
| 3,622,801 | 11/1971 | Stone | 307/311 |
| 3,598,999 | 8/1971 | Hofmeister | 250/204 |
| 3,447,069 | 5/1969 | Hamilton | 250/204 |
| 3,629,590 | 12/1971 | Case | 250/209 |
| 3,644,739 | 2/1972 | Wilkinson | 250/209 |

*Primary Examiner*—James W. Lawrence
*Assistant Examiner*—D. C. Nelms
*Attorney*—D. Carl Richards et al

[57] ABSTRACT

Relative movement between a barrier positioned with relation to light sources and light sensors produces a signal at the light sensors related to the barrier movement. Two light sources are alternately energized from a regulated voltage controlled current source to provide two sources of light of equal intensity with system perturbations minimized. Two light sensors positioned from the light sources respond to light from both of the alternately energized sources. A signal from a first of the light sensors connects to a voltage follower amplifier that provides a system output signal that varies with and is related to barrier movement. The second light sensor provides a signal to a regulator circuit that controls the current source to the light sources. This signal from the second light sensor is compared with a signal from a reference source to provide light source regulation. As an alternate embodiment, signals from both light sensors are coupled to voltage follower amplifiers each having an output signal related to the barrier movement. These two output signals are summed for a system output signal.

12 Claims, 8 Drawing Figures

3,783,277

LIGHT RESPONSIVE SENSOR SYSTEM

SUMMARY OF THE INVENTION

This invention relates to sensing relative movement, and more particularly to a photosensitive transducer system having a forced match between two light sources and sensor means responsive to the light from both sources to sense relative movement of a light barrier.

The use of a light source in a light sensing system to detect relative movement between parts of a system heretofore has involved the use of carefully matched sensors and a single source of light.

The present invention is directed to a system wherein two light sources and two sensors are employed, one of the sensors being employed in a regulating operation to force the two light sources to be matched and the resulting light from the two sources to be sensed by a second sensor with a movable barrier between the sources and the second sensor, the light sources being alternately energized.

More particularly in accordance with the invention, a sensor system comprises two alternately energized light sources and two sensors, each responsive to light from both the sources with a barrier having symmetry to a line lying in a plane between the sources and the sensors with the barrier adapted primarily to shield the first of the sensors from the sources. Means are provided for mounting the sources as a first unit, the sensors as a second unit, and the barrier as a third unit for relative movement in a direction perpendicular to the above-noted line between any two of the units to vary the relative amount of light falling on the first of the sensors from the two sources. A circuit responsive to the first of the sensors supplies a system output signal. Means responsive to the second of the sensors serves to equalize the light output from the two sources with respect to the second of the sensors.

BRIEF DESCRIPTION OF THE DRAWINGS

For a more complete understanding of the present invention and for further objects and advantages thereof, reference may now be had to the following description taken in conjunction with the accompanying drawings in which.

DESCRIPTION OF THE PREFERRED EMBODIMENT

Figure 1:
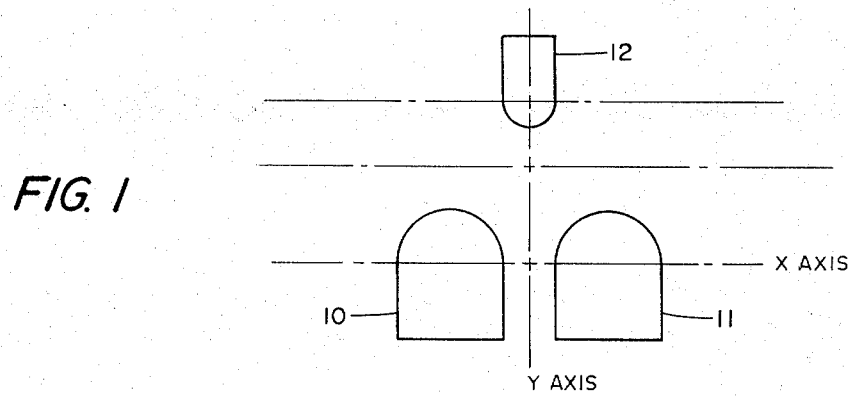
FIG. 1 diagrammatically illustrates in plan arrangement the light sources and a sensor.

Referring to FIG. 1, two light sources 10 and 11 and a single photo sensor 12 are positioned in a geometrical arrangement such that sensor 12 on the Y axis is equidistant from the two light sources spaced apart in the direction of the X axis. Sensor 12 is positioned to see each light source equally. Sources 10 and 11 are turned ON and OFF alternately by appropriate generator means so that when source 10 is ON, source 11 is OFF and when source 10 is OFF, source 11 is ON. Thus, the light pulse produced by source 11 is 180° out of phase with the light pulse produced by source 10 and sensor 12 "sees" each of the two sources alternately.

Figure 2:
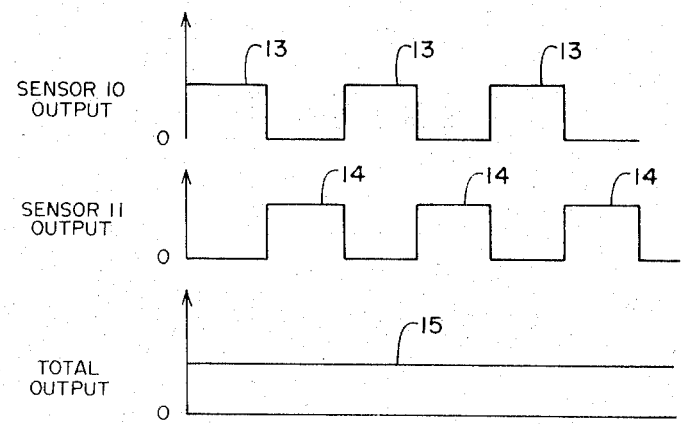
FIG. 2 includes graphs of sensor outputs under various conditions.
Figure 2:
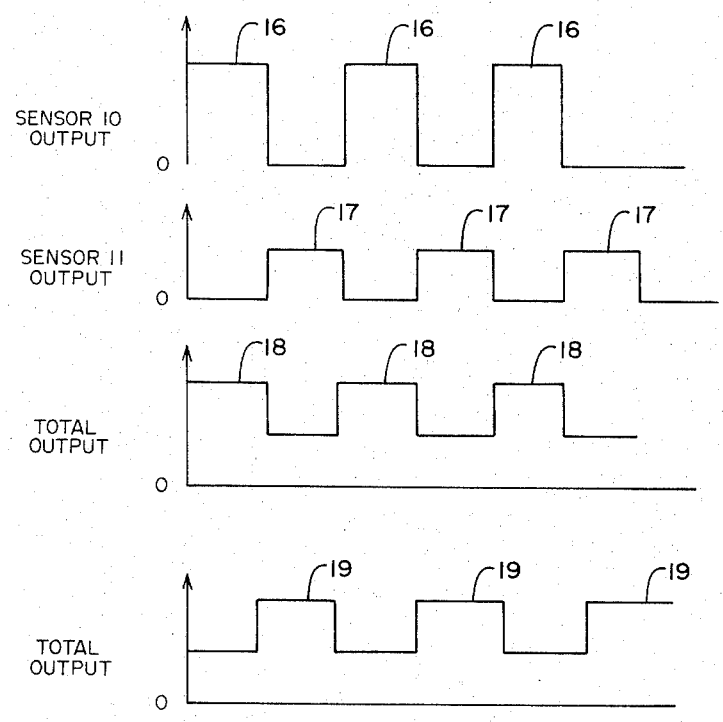

The output signal generated by sensor 12 as a result of illumination by source 11 is 180° out of phase with the output signal generated as a result of illumination by source 10. Graphically, this is shown in FIG. 2 where pulses 13 represent the sensor signal due to illumination by source 10 and pulses 14, by source 11.

If sensor 12 sees each light source equally, the total output is equal to the sum of the individual pulse trains and is pure D.C., shown by line 15 in FIG. 1. Thus, the sensor output is constant with no a.c. components thereby indicating a centered or nulled condition between the light sources 10 and 11 and the sensor 12.

Consider now the resulting condition, if the light intensity at sensor 12 from one source is greater than from the other, as if one source is made brighter than the other, sensor 12 is moved closer to one source than the other, or if the light from one light source is partially blocked. If sensor 12 sees source 10 better than source 11, the result is shown graphically by pulses 16 and 17, FIG. 2. The total output from sensor 12 now has an a.c. component as shown by line 18. There is an a.c. component present when source 10 is more intense or when source 11 is more intense, but the phases of the two a.c. signals differ by a factor of 180°. That is, when the photo sensor sees source 10 better than source 11, the a.c. component of the sensor output signal is in phase with the signal attributable to source 10. When the photo sensor sees source 11 better than source 10, the a.c. component of the sensor output signal is in phase with the signal attributable to source 11, or 180° out of phase with the signal attributable to source 10.

Figure 3:
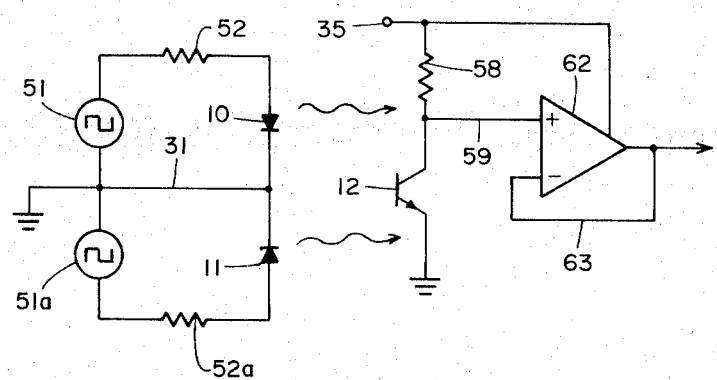
FIG. 3 is a circuit diagram for alternately energized light sources and a light responsive sensor in an output circuit.

Referring to FIG. 3, there is shown one circuit arrangement for sources 10 and 11 and photo transistor sensor 12. A drive circuit including square wave sources 51 and 51a provide square wave outputs alternately to turn on light sources 10 and 11. A common return line 31 leads to ground. The square wave source 51 connects to the light source 10 through a resistor 52 and the square wave source 51a connects to the light source 11 through a resistor 52a. The emitter of the photo sensor 12 is connected to ground. The collector of sensor 12 is connected by way of resistor 58 to terminal 35 and by way of conductor 59 to the non-inverting input of an operational amplifier 62 operating as a voltage follower through a feedback path 63 connected to the inverting input terminal.

At sensor 12 there exists an average level of illumination. The resultant average output signal from sensor 12 is directly related to this average illumination level. With a fixed geometrical arrangement, the average photo sensor output is a function of the gain of sensor 12 and the light output from the light sources. Under the additional assumption of a fixed supply voltage to sensor 12 at terminal 35 and fixed excitation to the light sources, the D.C. component of the sensor output signal is a function of the overall gain of the sensor light source system. A change in the conversion properties (light-to-electrical, or electrical-to-light) of any one of the components in the photo sensor light source system results in a change in the D.C. component of the sensor output signal.

When nulled, the output of the amplifier 62 is a pure D.C. signal with no a.c. component. Any change in the gain of sensor 12 will result in a change of the D.C. level of the output, but does not disturb the null of the system. That is, changes in the gain of sensor 12 alone will not cause any a.c. component to appear in the output signal. However, if the gain of either of sources 10 and 11 changes, an a.c. component will appear on the output signal of sensor 12, as well as changing the D.C. component of the output signal. This is illustrated in FIG. 2 by line 18 where the gain of light source 10 has increased relative to source 11 and in line 19 where the gain of source 11 is increased relative to source 10. If the intensities of the light sources track each other perfectly throughout gain changes there then will be no a.c. component at the output of the sensor 12; any change in the sensor output signal will be only a change in the pure D.C. level of the output signal.

Figure 4:
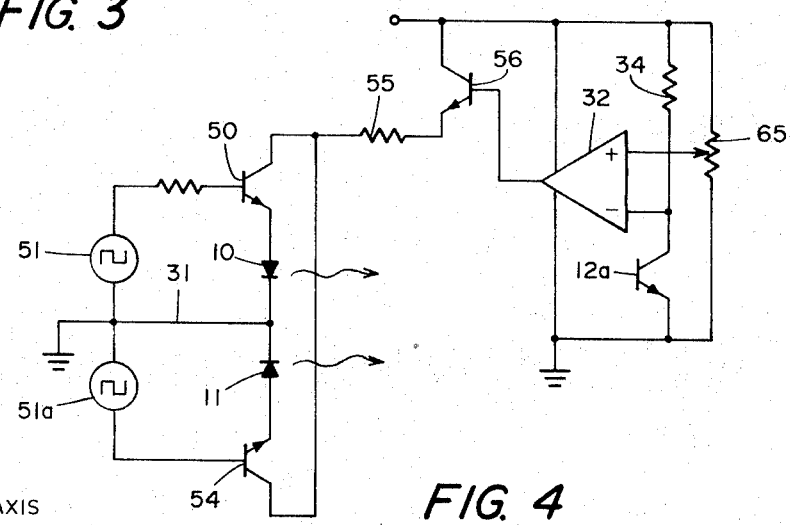
FIG. 4 is a circuit diagram of a regulator for alternately energized light sources.

FIG. 4 is another embodiment of a circuit for the geometrically fixed system of FIG. 1. In this circuit, sensor 12a is a photo transistor and the light sources 10 and 11 are light emitting diodes. The drive circuit includes the square wave sources 51 and 51a to provide the switching signals to direct voltage controlled current drive to diodes 10 and 11 alternately. The drive circuit is controlled by the output of a differential amplifier 32 through a transistor 56 and individual switching transistors 50 and 54. Connected to the inverting input of the amplifier 32 is the collector of the sensor 12 and a resistor 34. The output of sensor 12 is compared to a D.C. reference voltage through the high gain operational amplifier 32 by means of a connection to the wiper arm of a potentiometer 65. The output voltage from amplifier 32 controls the drive current delivered by the drive circuit to diodes 10 and 11.

With this cirucit, the output voltage of sensor 12 is regulated against a reference D.C. voltage. By this means, two objectives are realized. First, the gain of the system is held constant in the presence of parameter changes by keeping the D.C. level of the output signal constant. Secondly, by regulating the output of sensor 12 against a D.C. reference, the centering or null of the system is maintained in the presence of changes in the light output of diodes 10 and 11. The regulator circuit adjusts the current through diodes 10 and 11 continuously from cycle to cycle so that the gain and centering of the system remains constant in the presence of electrical parameter changes within the system.

Above described are two possible circuit arrangements for the geometrical arrangement shown in FIG. 1. The first is an unregulated system in which the output signal from sensor 12 changes in response to some perturbation to the system which causes the photo sensor to see one light source better than the other. The second is a regulated system in which the output of the photo sensor is held constant in response to changes within or perturbations to the system.

To gain the features of both these circuits they are combined into one system. More particularly, in FIGS. 5 and 6 two light sources 10 and 11, two photo sensors 12 and 12a, and one movable mechanical element 40 are shown. Sensors 12 and 12a and sources 10 and 11 are positioned symmetrically about the Y axis, and are located in planes that are perpendicular to the Y axis. Between sensor 12 and sources 10 and 11 there is a movable plate 40 with a thin slot 41 formed therein. Plate 40 lies in a plane perpendicular to the Y axis and is movable in either dirction along the X axis. The purpose of the slotted plate 40 is to partially obstruct the view by sensor 12 of sources 10 and 11. Plate 40 is centered in FIG. 5. In this position, sensor 12 sees light sources 10 and 11 equally. As plate 40 is moved in either direction away form the center point, sensor 12 sees one of the two light sources better than the other, and a corresponding a.c. signal is produced at the collector of sensor 12 whose magnitude and phase is indicative of the magnitude and direction of movement of plate 40. Sensor 12, then, responds to perturbations to the system.

Sensor 12a, however, has no obstruction between it and sources 10 and 11 and functions as a regulated system of the type described above. By combining the regulated and unregulated systems into one system stability is achieved. Because of the symmetrical arrangement of sensors 12 and 12a relative to sources 10 and 11, each sensor sees the light sources essentially the same with the plate 40 as positioned in FIG. 5. That is, any change in the light output from either source 10 and 11 is seen equally by each sensor.

Figure 7:
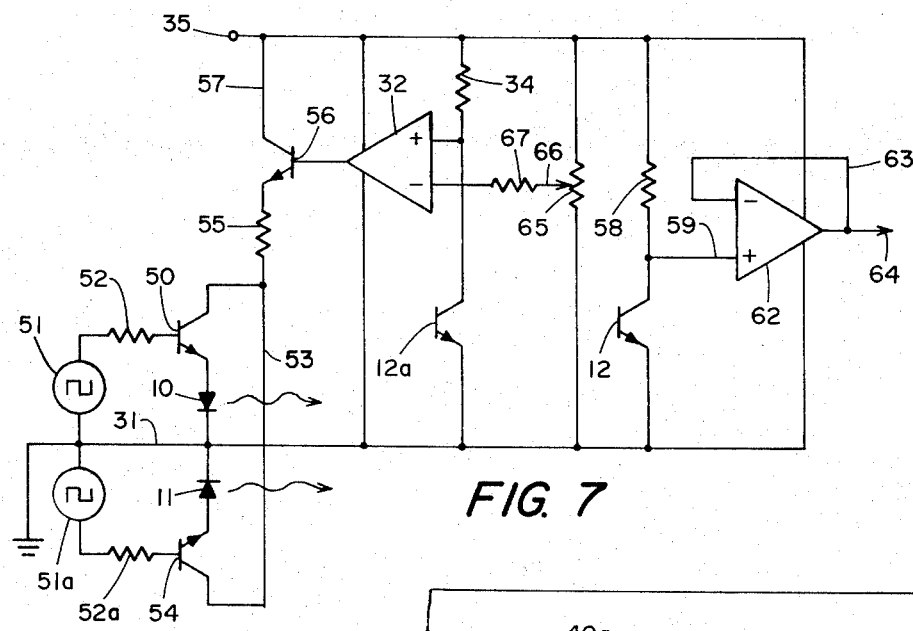
FIG. 7 is a schematic diagram of the circuit employed in one embodiment of the invention.

FIG. 7 illustrates a circuit in which the two systems are combined. Light source 10 is connected in a circuit with a transistor 50 whose base is connected to a square wave source 51 by way of resistor 52. The collector of transistor 50 is connected by way of conductor 53 to the collector of transistor 54 and by way of resistor 55 to the emitter of the transistor 56 whose base is connected to the output of amplifier 32 and whose collector is connected by way of conductor 57 to the B+ supply terminal 35. Sensor 12a is connected to amplifier 32 as in FIG. 4. Source 11 similarly is energized in response to square wave source 51a.

Resistor 65 is connected across the terminals of the supply, namely between line 31 and terminal 35. The adjustable tap 66 on potentiometer 65 is connected by way of resistor 67 to the inverting input of amplifier 32. The circuit of sensor 12a serves as a regulator, forcing a match between the sources 10 and 11.

Sensor 12 is connected at its emitter to the ground line 31. The collector of sensor 12 is connected by way of resistor 58 to terminal 35 and by way of conductor 59 to the non-inverting input of an operational amplifier 62 operating as a voltage follower through feedback path 63 connected to the inverting input terminal.

If sensor 12a and its associated regulator circuitry maintains a constant D.C. level and zero a.c. condition at the collector of sensor 12a, then with the slotted plate 40 in the center position, a constant D.C. level and zero a.c. condition will be maintained at the collector of sensor 12. Therefore, the regulated system compensates for any parameter changes within the system which could generate a false error signal or alter the response curve of the unregulated system.

Transistor 56 and resistor 55 constitute a voltage controlled current source which supplies the drive current to sources 10 and 11. The current through transistor 56 is alternately switched from source 10 to source 11 by switching transistors 50 and 54, respectively. The output signal at the junction of resistor 34 and the collector of sensor 12a is compared to a D.C. reference voltage, set by the potentiometer 65, through high gain operational amplifier 32.

The output of the unregulated portion of the system appears at the junction of resistor 58 and the collector of sensor 12. This output signal passes through high gain operational amplifier 62, which is connected as a voltage follower. The purpose of the voltage follower is to provide isolation between the collector circuit of sensor 12 and the circuitry which would normally be connected beyond its collector circuitry.

Figure 5:
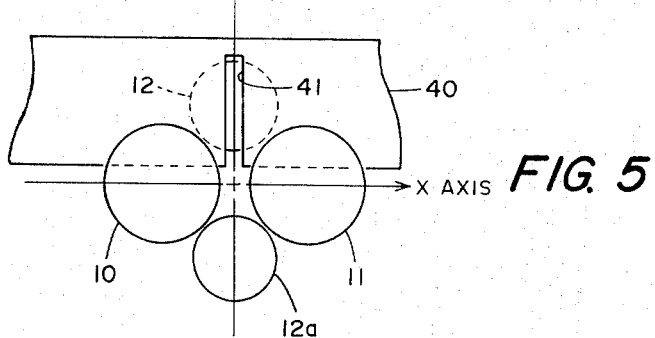
FIGS. 5 and 6 illustrate the geometry of sources and sensors embodied in the present invention.

In FIG. 5, the movable element is a plate 40 with a slot which is thin compared to the photo transistor receiving area. The movable element could be any structure that partially obstructs or tends to limit the view of the photo transistor. For example, a plate with a circular hole, or a thin solid rod, wire, or bar will also give usable results. Alternatively, plate 40 may be fixed and sensor 12 may be moved to sense movement. A curve of the output signal appearing on line 64, FIG. 7, versus mechanical displacement might be plotted for any given light source and sensor. Such a curve will be a function of the optical characteristics of the sensor 12 and the relative size of the obstruction associated with plate 40.

With a slotted plate 40 as the movable element, the sensitivity of the system decreases as the width of the slot increases and there will be a value of slot width at which the system begins to exhibit a dead zone about the center point or null point. As the slot width is further increased beyond that point, (assuming limited movement of the slot) the width of the dead zone about the center point also increases. This dead zone (area in which the sensor 12a always sees light) may be used to the benefit of the overall system.

Figure 6:
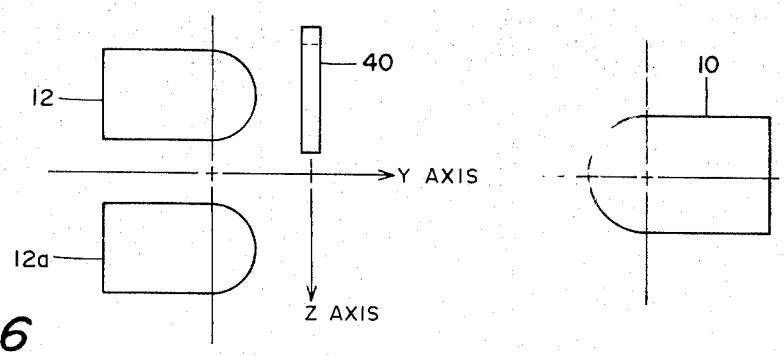

More particularly, the performance of a sensor system as illustrated in FIGS. 5 and 6 involves certain compromises to optimize in any one performance area. For example, sensitivity can be gained at a loss of useful range. Increased range can be gained at a loss of sensitivity. However, in the present system it is possible to have both wide range and high sensitivity by combining into one system two subsystems with complementary characteristics. That is, a high sensitivity, narrow range system is combined with a low sensitivity, wide range system. A composite system results which exhibits high sensitivity and wide range.

Figure 8:
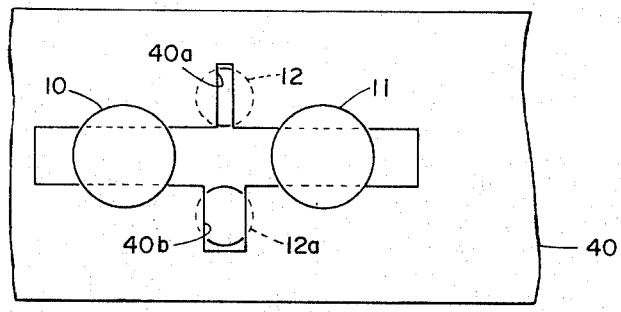
FIG. 8 diagrammatically illustrates in plan arrangement a pair of light sources and a pair of sensors with a dual slotted movable plate.

Such a system is as shown in FIG. 8 with two sensors 12 and 12a and two light sources 10 and 11 but in which the movable element 40 consists of two interconnected slotted plates one of the each covering light sources 10 and 11. The slot of plate 40a with which sensor 12 registers is narrow and the slot of plate 40b registering with sensor 12a is wide enough to cause the output of sensor 12a to exhibit a dead zone. The width of the dead zone over photo transistor 12a is chosen to be roughly that of the width of the useful range of sensor 12. In such case, when the outputs of sensors 12 and 12a are summed, the net result is a system with high sensitivity and wide range about the center point. Such a system includes two unregulated systems of the type shown in FIG. 3. However, the system shown in FIG. 7 can be modified to operate as the above described "two-speed" system. With a dual width slot sensor system used with the circuit of FIG. 7, an additional function must be added to the circuit, as shown in FIG. 9.

While several embodiments of the invention, together with modifications thereof, have been described in detail herein and shown in the accompanying drawings, it will be evident that various further modifications are possible without departing from the scope of the invention.

What is claimed is:

1. A sensor system which comprises:
   first and second light sources alternately energized,
   first and second light sensors positioned from said light sources and each responsive to light from both of said sources,
   a barrier positioned for relative movement with respect to said light sensors adapted primarily to selectively shield and vary the relative amount of light falling on a first of said sensors from said sources,
   a first circuit responsive to the first of said sensors to supply a system output signal, and
   a second circuit responsive to the second of said sensors to regulate the light output from said two light sources.

2. A sensor system as set forth in claim 1 including a voltage supply having an output connected to the second source to be compared with the signal from the second of said sensors.

3. A sensor system as set forth in claim 2 wherein the second circuit includes an amplifier responsive to the second sensor and connected to said voltage supply and having an output driving a voltage controlled current amplifier for regulating said light sources.

4. A sensor system as set forth in claim 1 wherein said first circuit includes a voltage follower amplifier having one input responsive to the first sensor.

5. A sensor system which comprises:
   first and second light sources alternately energized,
   first and second sensors positioned from said light sources and each responsive to light from both of the sources,
   a barrier positioned for relative movement with respect to said sensors adapted primarily to selectively shield and vary the relative amount of light falling on a first of said sensors from said sources,
   a first circuit including a voltage follower amplifier having one input responsive to the first of said sensors to supply a system output signal,
   a second circuit responsive to the second of said sensors to regulate the light output from said two sources, and
   a voltage source having an output for comparison with the signal from the second of said sensors and connected to the second circuit.

6. A sensor system as set forth in claim 5 wherein the second circuit includes an amplifier responsive to the second sensor and connected to said voltage source and having an output driving a voltage controlled current amplifier for regulating said light sources.

7. A sensor system which comprises:
   first and second light sources alternately energized,
   first and second sensors positioned from said light sources and each responsive to light from both of said sources,
   a barrier positioned for relative movement with respect to said light sensors adapted primarily to selectively shield and vary the relative amount of light falling on the first and second sensors from said light sources,
   a first circuit responsive to said first and second sensors to supply a system output signal, and a second circuit responsive to the second of said sensors to regulate the light output from said two light sources.

8. A sensor system as set forth in claim 7 wherein said barrier includes means for selectively shielding the light falling on a first of said sensors for a first pre-established movement of said barrier and second means for selectively shielding the relative amount of light falling on the second of said sensors over a second pre-established movement of said barrier.

9. A sensor system as set forth in claim 7 including a voltage source having an output for comparison with the signal from the second of said sensors and connected to the second circuit.

10. A sensor system as set forth in claim 7 wherein said first circuit includes a first voltage follower amplifier having one input responsive to the first sensor and providing an output signal and a second voltage follower amplifier having one input responsive to the second sensor and also providing an output signal, and circuit means for summing the output signals from said first and second voltage follower amplifiers to supply a system output signal.

11. A sensor system which comprises:
first and second light sources alternately energized,
first and second light sensors positioned from said light sources and each responsive to light from both of said sources,
a barrier positioned for relative movement with respect to said light sensors adapted primarily to selectively shield and vary the relative amount of light falling on said first and second sensors from said sources,
a first circuit including a first voltage follower amplifier having one input responsive to the first such sensor and providing an output signal, a second voltage follower amplifier having one input responsive to the second sensor and providing an output signal and circuit means for combining the output signals of the first and second voltage follower amplifier to supply a system output signal,
a second circuit responsive to the second of said sensors to regulate the light output from said two sources, and
a voltage source having an output for comparison with the signal from the second of said sensors and connected to the second circuit.

12. A sensor system as set forth in claim 11 wherein said barrier includes means for selectively shielding the light falling on a first of said sensors for a first pre-established movement of said barrier and second means for selectively shielding the relative amount of light falling on the second of said sensors over a second pre-established movement of said barrier.

* * * * *

PO-1050
(5/69)

UNITED STATES PATENT OFFICE
CERTIFICATE OF CORRECTION

Patent No. __3,783,277__  Dated __Jan. 1, 1974__

Inventor(s) __James R. Younkin and John M. Nixon__

It is certified that error appears in the above-identified patent and that said Letters Patent are hereby corrected as shown below:

```
Col. 2, line 18, "Figure 1" should be --Figure 2--.
Col. 4, line 26, "10 and 11" should be --10 or 11--.
Col. 5, line 50, cancel "of the each";
        line 51, "sources" should be --source--;
        line 51, after "and" insert --the second covering light
                    source--;
        line 51, cancel "of plate";
        line 52, cancel "of plate";
        line 55, cancel "over photo transistor" and insert --for
                    sensor--;
        line 65, cancel ",as shown in FIG. 9".
```

Signed and sealed this 18th day of June 1974.

(SEAL)
Attest:

EDWARD M. FLETCHER, JR.
Attesting Officer

C. MARSHALL DANN
Commissioner of Patents